H. E. BARROWS.
SPRING WHEEL.
APPLICATION FILED JULY 7, 1914.

1,133,216.

Patented Mar. 23, 1915.

Witnesses
Inventor
H. E. Barrows

UNITED STATES PATENT OFFICE.

HARRY E. BARROWS, OF MAQUOKETA, IOWA.

SPRING-WHEEL.

1,133,216.

Specification of Letters Patent.  Patented Mar. 23, 1915.

Application filed July 7, 1914. Serial No. 849,515.

*To all whom it may concern:*

Be it known that I, HARRY E. BARROWS, citizen of the United States, residing at Maquoketa, in the county of Jackson and State of Iowa, have invented new and useful Improvements in Spring-Wheels, of which the following is a specification.

My present invention pertains to spring or cushioned wheels; and it contemplates the provision of a simple and inexpensive spring wheel that is at once, light in weight and strong and durable.

Figure 1:
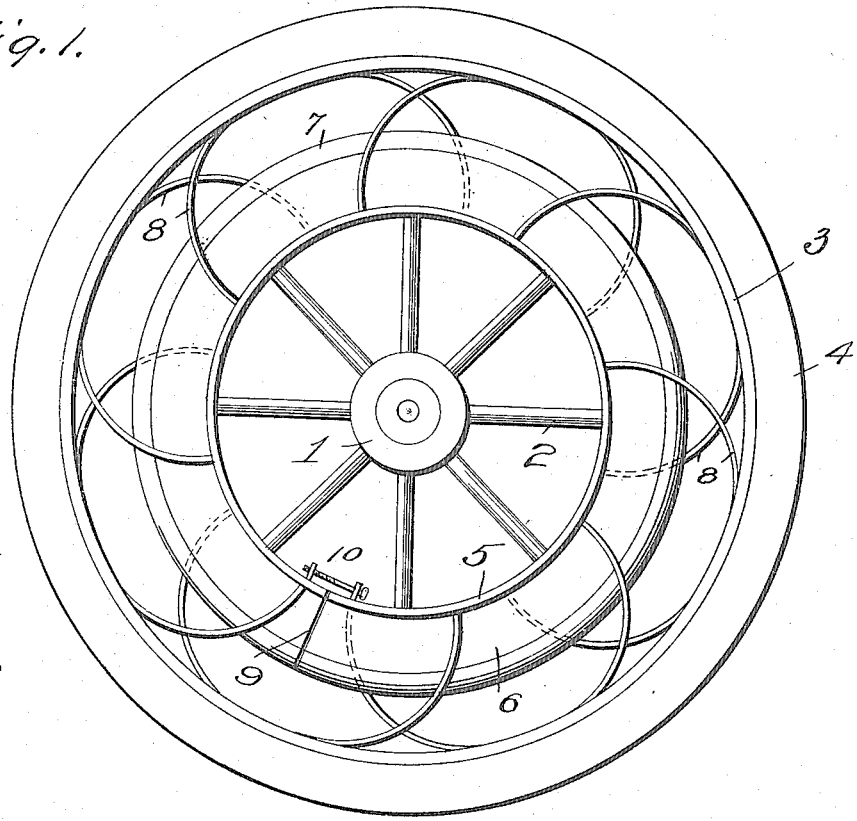
Figure 2:
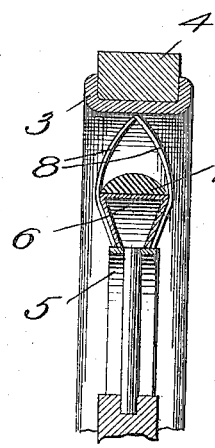

Other advantageous characteristics of the invention will be fully understood from the following description and claim when the same are read in connection with the drawings, accompanying and forming part of this specification, in which:

Figure 1 is a side elevation illustrating the spring wheel constituting the best practical embodiment of my invention that I have as yet devised. Fig. 2 is a fragmentary transverse section, showing the relative arrangement of the springs and spring-supporting means of the wheel.

Similar numerals of reference designate corresponding parts in both views of the drawings.

The hub 1 and the spokes 2 as well as the felly 3 and the tire 4 may be and preferably are of the well known conventional construction, and from this it follows that ordinary wheels such as at present in general use may be reconstructed and my invention embraced therein.

In furtherance of my invention, I surround the spokes 2 with a spring-steel rim 5 that is connected to the spokes in the manner shown in Fig. 2 or in any other manner compatible with the purpose of my invention, and in the annular space between said rim 5 and the felly 3 I arrange the spring-supporting or reinforcing annulus 6, the yielding bumper 7 thereon and the springs 8. The rim 5, annulus 6 and the bumper 7 are split, as indicated at 9, and an adjusting screw or other suitable means is provided on the rim at 10 to permit of the rim 5, annulus 6 and bumper 7 being tightened to a slight extent about the spokes. The annulus 6 is V-shaped in cross-section and is made of thin sheet-metal. Its edges are suitably fixed to the perimeter of the rim 5, and it is arranged between the two groups of springs after the manner shown, this in order to reinforce and support the springs and prevent breaking of the same when they are subjected to great lateral strain.

As shown in Figs. 1 and 2 one group of the springs 8 is arranged at one side of the annulus 6 and the other group of springs at the opposite side of said annulus. It will also be noted that the inner ends of the springs are connected to the edge portions of the rim 5, and the outer ends of the springs are connected to the felly 3; also, that the inner portions of the springs are arranged close against the sides of the annulus 6, whereby said annulus is enabled to support and reinforce the springs as hereinbefore described.

It will be gathered from the foregoing that by reason of its hollow form and V-shaped configuration the annulus 6 is enabled to perform the important function ascribed to it without materially increasing the weight of the wheel.

The bumper 7 arranged between the groups of springs and on the perimeter of the annulus 6 is formed of rubber or other yielding material suitable to the purpose and is designed as its name imports to prevent undue compression and breakage of the springs when a very heavy load is imposed on the wheel or when the wheel is passing over a rough road.

The rim 3 is preferably, though not necessarily, of metal, while the tire 4 is preferably of vulcanized rubber. I would have it understood, however, that the felly 3 and the tire 4 may be of any form and material compatible with the purpose of my invention without involving departure from the scope of the same as claimed.

Having described my invention, what I claim and desire to secure by Letters-Patent, is:

The combination in a spring wheel, of an inner portion having a rim, an annulus, of V-shape in cross-section, surrounding the rim with its comparatively wide portion outermost and fixed with respect to the rim, a felly surrounding and spaced from said annulus, and groups of springs arranged at opposite sides of and bearing close against the inwardly-inclined sides of the annulus, said springs being connected at their inner ends to the rim and at their outer ends to the felly and having their outer ends arranged in the longitudinal center of the felly.

In testimony whereof I have hereunto set my hand in presence of two subscribing witnesses.

HARRY E. BARROWS.

Witnesses:
I. M. POTTER,
A. W. SOKOL.

Copies of this patent may be obtained for five cents each, by addressing the "Commissioner of Patents, Washington, D. C."